Patented May 1, 1928.

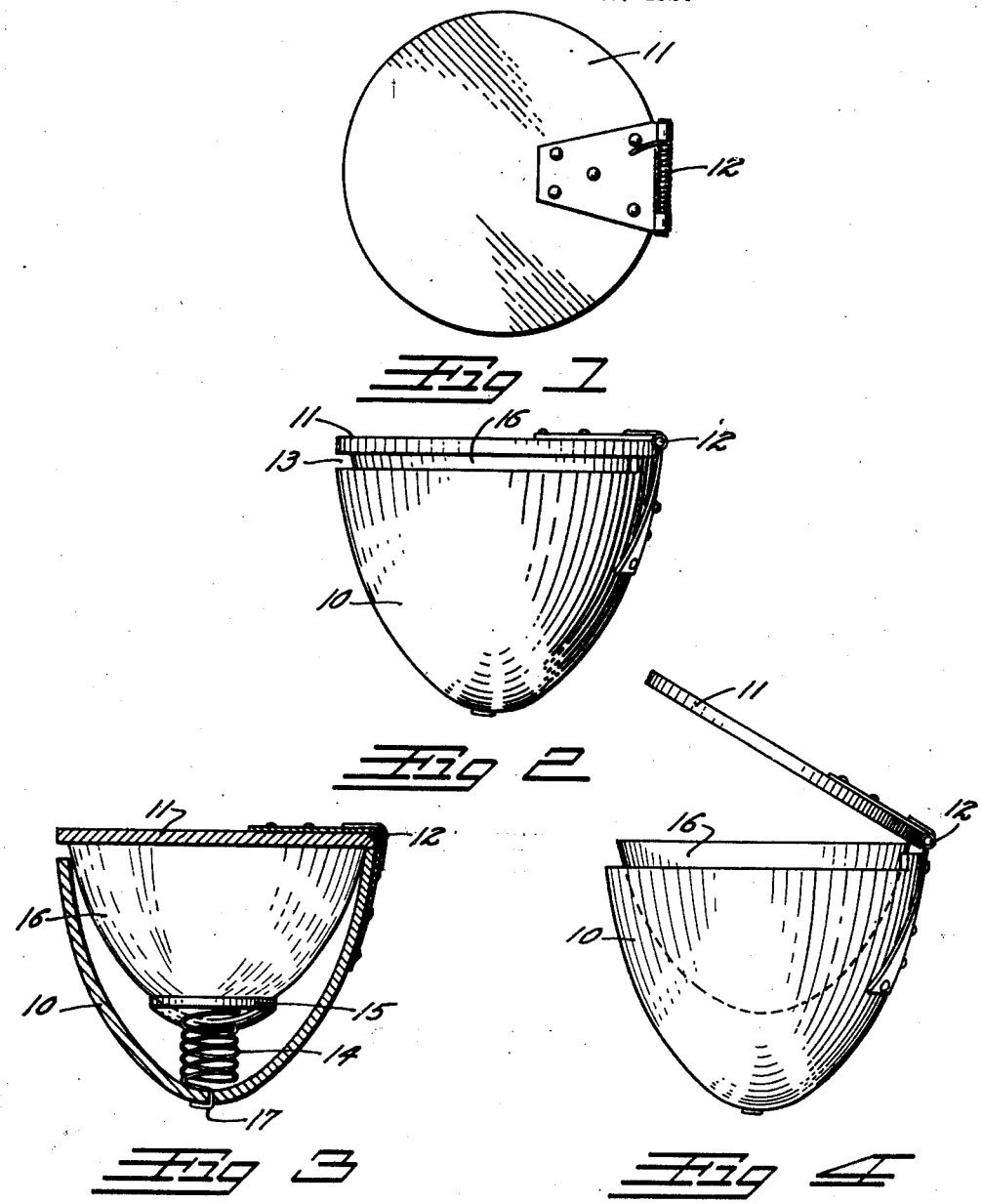

1,667,902

UNITED STATES PATENT OFFICE.

JOHN OSBORNE, OF PUEBLO, COLORADO.

CHALK-LINE CHALK HOLDER.

Application filed November 29, 1924, Serial No. 752,998. Renewed December 2, 1927.

The invention relates to a device for holding and applying a carpenter's chalk cake to a chalk line and has for its principal object the provision of a chalk holder which will protect the chalk cake and which will automatically feed the chalk as it is worn away by the line.

A further object is to provide a chalk holder that can be used for chalking a loose or unfastened line as well as one which has been secured in place.

Other objects and advantages reside in the detail construction of the invention, which result in simplicity, economy, and efficiency, and which will become more apparent from the following description.

In the following detailed description of the invention reference is had to the accompanying drawing which forms a part hereof. Like numerals refer to like parts in all views of the drawing and throughout the description.

In the drawing:

Fig. 1 is a plan view of the improved chalk holder.

Fig. 2 is a side elevation of the same.

Fig. 3 is a sectional view of the holder.

Fig. 4 is a side elevation showing the lid partly open.

The holder comprises a cup-shaped bowl 10, closed by means of a lid 11, which is hinged to the bowl 10 by means of a spring hinge 12. The upper edge of the bowl 10 is cut down, except adjacent the hinge 12, so as to leave a slot 13 between the lid 11 and the bowl 10.

In the bottom of the bowl 10, a helical spring 14 is secured which carries a cupped chalk seat 15 in which one of the usual semi-spherical chalk cakes 16 is seated. One extremity of the spring 14 is passed through the bowl 10, as indicated at 17, to hold the spring in place. The spring may be similarly secured to the seat 15.

The expansion of the spring 14 need only be sufficient to maintain the chalk cake against the lid 11 and must not be sufficiently strong to overcome the action of the spring in the hinge 12 and force the lid open.

When the device is used on chalk lines which are fastened at one end, the line is placed in the notch 13 and the holder is drawn along the line. The line will cut into and wear away the top of the cake allowing the spring 14 to raise the cake and expose a new section.

When the device is used for chalking a loose line, the lid may be raised, as indicated in Fig. 4, and the line laid over the chalk cake. The lid is then closed and, while the holder is held in one hand, the line is drawn through with the other.

The spring 14 will constantly advance the cake as it is worn away so that practically the entire cake can be advantageously used.

While a specific form of the improvement has been described and illustrated herein, it is desired and understood that the same may be varied, within the scope of the appended claim, without departing from the spirit of the invention.

Having thus described the invention, what I claim and desire to secure by Letters Patent is:

A chalk holder comprising a bowl arranged to enclose a chalk cake; a projection on the rim of said bowl; a lid hinged to said projection so as to be spaced from the rim of said bowl; a spring arranged to maintain said lid over said bowl, a seat for a chalk cake arranged within said bowl and a spring compressed between said seat and said bowl so as to maintain said cake in contact with said lid.

In testimony whereof, I affix my signature.

JOHN OSBORNE.